US012687608B2

(12) United States Patent
    Convent et al.

(10) Patent No.:    US 12,687,608 B2
(45) Date of Patent:        Jul. 21, 2026

(54) RADAR ARRANGEMENT

(71) Applicant: Krohne Messtechnik GmbH, Duisburg (DE)

(72) Inventors: Thomas Convent, Issum (DE); Markus Hammes, Dinslaken (DE); Charalambos Ouzounis, Bochum (DE); Christoph Schmits, Dortmund (DE)

(73) Assignee: Krohne Messtechnik GmbH, Duisburg (DE)

( * ) Notice: Subject to any disclaimer, the term of this patent is extended or adjusted under 35 U.S.C. 154(b) by 311 days.

(21) Appl. No.: 18/210,432

(22) Filed: Jun. 15, 2023

(65) Prior Publication Data

US 2024/0019537 A1      Jan. 18, 2024

(30) Foreign Application Priority Data

Jun. 15, 2022    (DE) ..................... 10 2022 115 119.0
May 26, 2023    (DE) ..................... 10 2023 113 912.6

(51) Int. Cl.
   *H01Q 1/22*          (2006.01)
   *G01S 7/03*          (2006.01)
   *H01Q 13/02*         (2006.01)

(52) U.S. Cl.
   CPC .............. *G01S 7/032* (2013.01); *H01Q 1/22* (2013.01); *H01Q 13/02* (2013.01)

(58) Field of Classification Search
   CPC .......... G01S 7/032; H01Q 1/22; H01Q 13/02; H01Q 1/225; H01P 5/182; H01P 5/227; H01P 5/024; H01P 5/107
   See application file for complete search history.

(56) References Cited

U.S. PATENT DOCUMENTS 7,579,925 B2 *    8/2009  Fan ........................... H01P 5/02
                                                          333/33
9,300,025 B2 *    3/2016  Herbsommer .......... H01P 3/165
                      (Continued)

FOREIGN PATENT DOCUMENTS

DE    102019217736 A1    5/2021
EP         2963440 A1    1/2016
                (Continued)

OTHER PUBLICATIONS

N. Van Thienen, Y. Zhang and P. Reynaert, "Bidirectional Communication Circuits for a 120-GHz PMF Data Link in 40-nm CMOS," in IEEE Journal of Solid-State Circuits, vol. 53, No. 7, pp. 2023-2031, Jul. 2018, doi: 10.1109/JSSC.2018.2822714.
                (Continued)

*Primary Examiner* — Resha Desai
*Assistant Examiner* — Bongani Jabulani Mashele
(74) *Attorney, Agent, or Firm* — Muncy, Geissler, Olds & Lowe, P.C.

(57)            ABSTRACT

A radar arrangement includes a multi-layer printed circuit board, an antenna, an electronic component for generating and converting a high frequency (HF) signal, and a lead structure for guiding the HF signal between the electronic component and the antenna. The circuit board includes a first layer of a carrier material and a second layer of a HF substrate. The electronic component and the antenna are arranged on a component side of the HF substrate. The lead structure is arranged at least in regions on the component side. The component side is cast at least in the region of the electronic component. A metal layer is arranged between the first and second layers. The lead structure is connected to the metal layer in areas via a through-hole such that the through-hole forms a DC short circuit so the lead structure and the metal layer have the same potential during operation.

18 Claims, 3 Drawing Sheets

(56)            References Cited

U.S. PATENT DOCUMENTS

2006/0274992  A1    12/2006  Shimura et al.
2011/0140801  A1     6/2011  Shimura et al.

FOREIGN PATENT DOCUMENTS

EP            3134748  B1     3/2017
JP          2010212524  A      9/2010
WO      WO-2019246497  A1  *  12/2019    ......... H04L 12/2801
WO      WO-2021099119  A1  *   5/2021    ............. H01P 3/121

OTHER PUBLICATIONS

F. Michler, B. Scheiner, F. Lurz, R. Weigel and A. Koelpin, "(Micro)Metering with Microwaves: A Low-Cost, Low-Power, High-Precision Radar System," in IEEE Microwave Magazine, vol. 20, No. 1, pp. 91-97, Jan. 2019, doi: 10.1109/MMM.2018.2875612.

* cited by examiner

RADAR ARRANGEMENT

TECHNICAL FIELD

The invention is based on a radar arrangement comprising at least one multi-layer printed circuit board, at least one antenna, at least one electronic component for generating and converting a high frequency signal and at least one lead structure for guiding the high frequency signal between the electronic component and the antenna, wherein the multi-layer printed circuit board comprises at least a first layer of a carrier material and at least a second layer of a high frequency substrate (HF substrate), wherein the HF substrate has a component side and wherein at least the electronic component for generating and converting the high frequency signal and the antenna are arranged on the component side and wherein the at least one lead structure for guiding the high frequency signal is arranged at least in regions on the component side, wherein the component side is cast at least in the region of the electronic component for generating and for converting a high-frequency signal.

BACKGROUND

In the construction of radar arrangements, i.e. of printed circuit boards which have components for generating, guiding and radiating electromagnetic waves, the safety of such arrangements is linked to requirements with regard to explosion protection which must be complied with by such arrangements.

A distinction must be made here between requirements for different types of ignition protection that minimize the risk of sparks being generated in an explosive atmosphere. Of particular relevance in the context of the present invention are the Ex i type of ignition protection, i.e. the requirements of an intrinsically safe circuit in which no spark or thermal effect occurs that could cause ignition of an explosive atmosphere, and the Ex mb type of ignition protection, i.e. the requirements of encapsulation, wherein components that could ignite in an explosive atmosphere are embedded in encapsulating compound.

SUMMARY

The object of the present invention is to provide a radar arrangement which ensures particularly safe operation and a particularly high level of explosion protection.

According to the invention, the aforementioned object is achieved in that a metal layer having an electrical reference potential is arranged between the first layer and the second layer, and that the lead structure is connected to the metal layer in regions via at least one through-hole in such a way that the at least one through-hole forms a DC short circuit, so that the lead structure and the metal layer have the same potential during operation.

In this case, the at least one through-hole forms only a DC short circuit, wherein the high frequency signal is not transmitted via the through-hole. In this way, it can be ensured that the through-hole does not, or does not significantly, affect the power of the high frequency signal transmitted to the antenna or electronic component.

It has been recognized that insofar as the lead structure has the reference potential of the radar arrangement, no different potential can develop between the lead structure and metal layers that have the reference potential, even in the event of an error. In this respect, it is not necessary to provide the lead structure completely with a casting compound in order to maintain explosion protection.

The electronic component for generating and converting a high frequency signal may be, for example, an integrated circuit (IC).

According to one design, the carrier material comprises a composite material of glass fiber fabric and epoxy resin, in particular a composite material of a flame retardant FR-4 composite material. Such a design of the substrate material ensures a mechanically stable structure and, at the same time, an improvement in the explosion protection of the radar assembly.

The HF substrate has a material with low attenuation for electromagnetic waves at frequencies of the high frequency signal. For example, the HF substrate has an epoxy base.

Due to the through-hole between the lead structure and the metal layer, there are no explosion protection requirements for the thickness of the HF substrate arranged between the lead structure and the metal layer. Rather, the thickness of the HF substrate depends in particular on the frequency to be transmitted and the permittivity of the HF substrate. For example, the HF substrate may have a thickness of about 100 μm, or a thickness of about 200 μm, or a thickness of more than 200 μm.

According to one design, the lead structure is arranged only regionally on the component side. According to another design, the lead structure is completely arranged on the component side of the HF substrate.

During operation, the high frequency signal is radiated to the outside via the antenna. For this purpose, the antenna may be designed as a horn antenna, for example, with a round and/or oval and/or polygonal, for example a rectangular, cross-section. Alternatively, the antenna may be designed as a patch antenna, a dipole antenna or a dielectric rod antenna.

According to one design of the radar arrangement, the antenna is metallically conductive, wherein the antenna is potential-free or connected to the reference potential.

According to a further design of the radar arrangement, the reference potential is the ground potential of the radar arrangement, in particular of the electronic component for generating and converting the high frequency signal.

Particularly preferably, at least one through-hole is arranged in the area of the casting. This design has the advantage that as soon as the lead structure leaves the area of the casting, it is ensured that the lead structure has the reference potential, so that no potential difference to the metal layer can occur outside the casting. Thus, this design also improves the explosion protection of the radar arrangement.

According to a next preferred design of the radar arrangement, the lead structure has a first conductor and a second conductor, wherein the first conductor carries the high frequency signal from the electronic component towards the antenna and wherein the second conductor carries the high frequency signal received from the antenna towards the electronic component, wherein the first conductor and the second conductor are each connected to the metal layer via at least one through-hole forming a DC short circuit.

Particularly preferably, at least one through-hole of the first conductor and/or at least one through-hole of the second conductor is arranged in the region of the casting. According to a further design, both the first conductor and the second conductor are each connected to the metal layer via a plurality of through-holes, wherein at least one through-hole of the first conductor and/or at least one through-hole of the second conductor is arranged in the region of the casting.

Particularly preferably, at least one through-hole of the first conductor is arranged in the region of the casting and at least one through-hole of the first conductor is arranged outside the casting and/or at least one through-hole of the second conductor is arranged in the region of the casting and at least one through-hole of the second conductor is arranged outside the casting.

According to a further preferred design, the casting has a cavity in the area of the lead structure. Since the transmission characteristics of the transmission of the high frequency signal in the casting are less well known and, moreover, may also vary during manufacture, this design improves the radar arrangement with respect to the transmission of the high frequency signal by means of the lead structure in the area of the casting and/or reduces possible influences of the casting on the transmission of the high frequency signal which are difficult to assess.

According to a further preferred design of the radar arrangement, a plurality of through-holes forming a DC short circuit is provided between the lead structure and the metal layer, which together with the lead structure and the metal layer form a waveguide in the HF substrate for guiding the high frequency signal. In detail, the arrangement of the through-holes, the lead structure and the metal layer forms a SIW structure (Substrate Integrated Waveguide structure).

According to this design, during operation, the high frequency signal from the lead structure couples into the HF substrate, preferably in the region of the casting, and is then transmitted to the antenna via the waveguide and radiated into free space in the region of the antenna. Conversely, when a high frequency signal is received from the antenna, this signal couples into the waveguide designed in the HF substrate and is transmitted through the substrate into the lead structure and then into the electronic component to generate and convert the high frequency signal.

In addition to the through-holes forming the waveguide, there are further through-holes to the metal layer, particularly in the area of the electronic component and especially in the area of the antenna, which limit the wave propagation in the HF substrate. By limiting the wave propagation, it can be prevented that the high frequency signal propagates uncontrolled over the HF substrate, whereby power of the signal to be transmitted or of the received signal is lost.

Particularly preferably, the first conductor of the lead structure confines a first partial waveguide via which the HF signal is guided from the electronic component towards the antenna and the second conductor of the lead structure confines a second partial waveguide via which the received HF signal is guided from the antenna towards the electronic component, wherein the first partial waveguide and the second partial waveguide have a common guiding area. It is implemented via the common guiding region that the high frequency signal is guided into the antenna, and the high frequency signal received from the antenna is transmitted to the electronic component via the same common waveguide section. Thus, the common guiding section forms a coupler between the first and second partial waveguides.

Outside of the casting, the first waveguide and the second waveguide may also form a common structure, such as a metal layer, that confines the first partial waveguide and the second partial waveguide.

According to another design of the radar arrangement, the waveguide is arranged in areas in the region of the casting, so that during operation the coupling of the high frequency signal into the waveguide or the decoupling of the high frequency signal from the waveguide takes place in the region of the casting.

According to another design, the lead structure is connected to at least one through-hole via at least one stub, wherein the stub is dimensioned such that the high frequency signal is not or not substantially transmitted to the through-hole. According to this design, the presence of the at least one stub prevents power of the generated or received high frequency signal from being lost through the through-holes. The at least one stub has a length of n*($\lambda$/4), wherein $\lambda$ is the wavelength of the generated high frequency signal and n is an odd number.

According to a further design, the lead structure is connected via at least two stubs with at least two through-holes or via at least three stubs with at least three through-holes.

If the lead structure comprises a first conductor and a second conductor, wherein the first conductor carries the high frequency signal from the electronic component to the antenna and wherein the second conductor carries the high frequency signal received from the antenna to the electronic component, preferably the first conductor is connected to at least one through-hole via at least one stub and the second conductor is connected to at least one through-hole via at least one stub. If the first conductor and the second conductor are each connected to a through-hole via exactly one stub, the stubs preferably have a width of about 2 mm.

According to a next design, the first conductor is connected via two stubs with two through-holes and the second conductor is connected via two stubs with two through-holes. According to this design, the stubs preferably have a width of about 1 mm.

According to a next design, the first conductor is connected via three stubs with three through-holes and the second conductor is connected via three stubs with three through-holes. According to this design, the stubs preferably have a width that can support a continuous current that depends on the explosion protection standard to be implemented.

If the lead structure comprises a first conductor and a second conductor, wherein the first conductor carries the high frequency signal from the electronic component to the antenna and wherein the second conductor carries the high frequency signal received from the antenna to the electronic component, wherein the first conductor and the second conductor are connected to the metal layer via at least one through-hole forming a DC short circuit each, it is particularly preferred that the first conductor and the second conductor are connected to each other via a directional coupler.

Particularly preferably, according to the previously described designs, the high frequency signal is guided to the antenna during operation by means of the lead structure, wherein the lead structure is completely arranged on the component side.

BRIEF DESCRIPTION OF THE DRAWINGS

There is now a large number of possibilities for designing and further developing the radar arrangement according to the invention. In this regard, reference is made to the following description of preferred embodiments in conjunction with the drawings.

DETAILED DESCRIPTION

Figure 1:
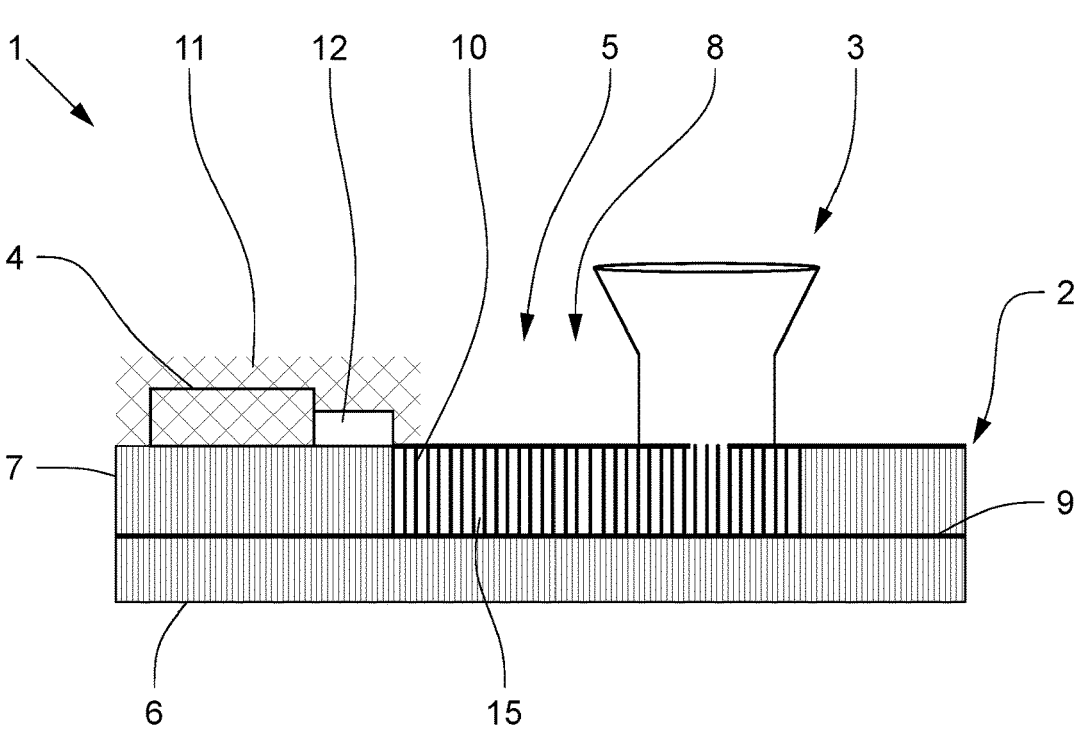
FIG. 1 illustrates a first embodiment of a radar arrangement.

FIG. 1 shows purely schematically a first embodiment of a radar arrangement 1 comprising a multi-layer printed circuit board 2, an antenna 3, an electronic component 4 for generating and converting a high frequency signal, which is designed as an IC in the embodiment shown, and at least one lead structure 5 for guiding the high frequency signal between the electronic component 4 and the antenna 3.

The multi-layer printed circuit board 2 has a first layer 6 made of a carrier material, which is made of an FR4-composite material in the embodiment shown, and a second layer 7 made of an HF substrate.

The upper side of the HF substrate forms the mounting side 8 of the printed circuit board 2. The electronic component 4 for generating and converting the high frequency signal and the antenna 3 are arranged on the mounting side 8. In addition, the lead structure 5 for carrying the high frequency signal is also arranged on the component side 8.

Furthermore, the component side 8 is potted in the region of the electronic component 4 for generating and converting the high frequency signal, so that no spark capable of ignition can be generated in the region of the electronic component 4 during operation.

A metal layer 9 is arranged between the first layer 6 and the second layer 7, which has an electrical reference potential. The lead structure 5 is connected to the metal layer 9 in areas via through-holes 10 in such a way that the through-holes 10 form a DC short circuit, so that the lead structure 5 and the metal layer 9 have the same potential during operation. This ensures that no voltages build up during operation, even in the event of an error, which could result in the generation of sparks in an ignitable atmosphere.

The casting compound 11 has a cavity 12 in the area of the lead structure 5, so that the transmission of the generated high frequency signal is not or not significantly negatively affected by variable properties of the casting compound 11.

The lead structure 5 has a first conductor 13 and a second conductor 14, wherein the first conductor 13 guides the high frequency signal from the electronic component 4 to the antenna 3 and wherein the second conductor 14 guides the high frequency signal received from the antenna 3 to the electronic component 4, wherein the first conductor 13 and the second conductor 14 are each connected to the metal layer 9 by through-holes 10 forming a DC short circuit.

In addition to forming a DC short circuit, the through-holes 10 also have the function of forming a waveguide 15 in the HF substrate together with the lead structure 5 and the metal layer 9, wherein the generated high frequency signal is transmitted to the antenna 3 via the waveguide 15 and wherein a high frequency signal received from the antenna 3 is transmitted to the electronic component 4 via the waveguide 15. It is shown here purely schematically that the waveguide 15 in the HF substrate 7 extends as a whole from the coupling region in the area of the casting compound 11 to the antenna 3. Thus, FIG. 1 does not represent an exact sectional view from the top view representation of the embodiment as shown in FIG. 2.

Figure 2:
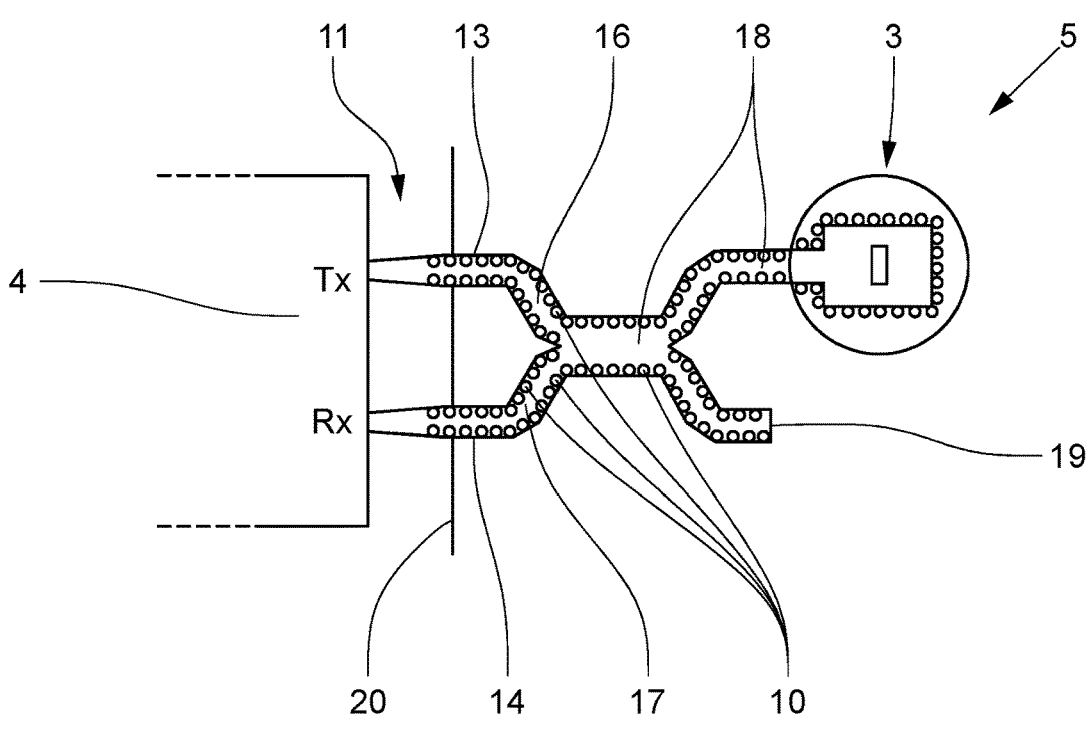
FIG. 2 illustrates a top view of the lead structure of the first embodiment.

As shown in FIG. 2, the first conductor 13 confines a first partial waveguide 16, via which the high frequency signal is routed from the electronic component 4 to the antenna 3, and the second conductor 14 confines a second partial waveguide 17, via which the received high frequency signal is routed from the antenna 3 to the electronic component 4. Thereby, the first partial waveguide 16 and the second partial waveguide 17 have a common guiding region 18, this is shown in FIG. 2.

In addition to the through-holes 10 shown, which form the waveguide 15, there are further through-holes, not shown here, which limit the wave propagation, in particular in the area of coupling into the waveguide 15 and in the area of coupling out at the antenna.

FIG. 2 shows the lead structure 5 of the first embodiment in top view. In detail, a first conductor 13 is provided having a plurality of through-holes 10 forming a first partial waveguide 16. Via the first partial waveguide 16, the high frequency signal is routed from the electronic component 4 towards the antenna 3 during operation. The second conductor 14 has a plurality of through-holes 10 forming a second partial waveguide 17. Via the second partial waveguide 17, the received high frequency signal is guided from the antenna 3 towards the electronic component 4 during operation. In addition, the first partial waveguide 16 and the second partial waveguide 17 have a common guiding region 18, so that the high frequency signal can be transmitted to and from the antenna 3 via the same waveguide section. The high frequency signal generated by the electronic component 4 is guided via the first partial waveguide 16 to the common region 18 with the second partial waveguide 17. After merging, the high frequency signal runs either into the waveguide section that guides the high frequency signal to the antenna 3 or into the waveguide absorber 19. The high frequency signal received from the antenna 3 runs to the second partial waveguide 17 via the common waveguide region 18. A small part may also couple into the first partial waveguide 16.

In addition, the casting boundary 20 of the casting 11 is shown in the area of the electronic component 4. The casting boundary 20 is arranged in such a way that both through-holes 10 of the first partial waveguide 16 and through-holes 10 of the second partial waveguide 17 are arranged in the area of the casting 11.

Figures 3, 4:
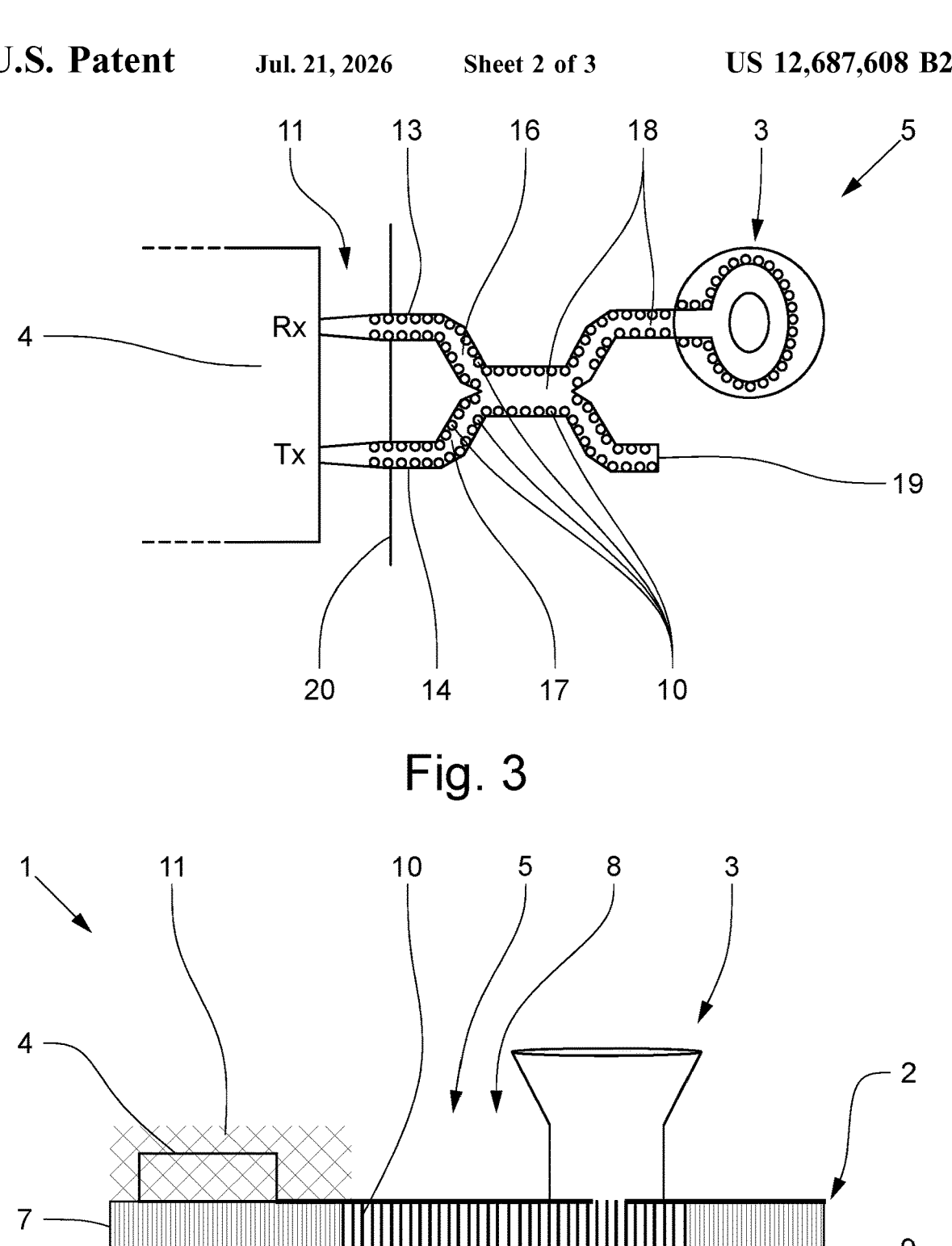
FIG. 3 illustrates a second embodiment of a radar arrangement.
FIG. 4 illustrates another embodiment of a radar arrangement.

FIG. 3 shows an alternative embodiment in which the antenna 3 does not have a rectangular shape but an elliptical shape. In addition, the arrangement of the transmit output Tx and the receive input Rx of the electronic component 4 is reversed. Basically, the transmission directions towards the antenna 3 and away from the antenna 3 have different attenuations. Depending on the application, i.e. depending on the desired attenuation, the first conductor 13 is therefore used to transmit the high frequency signal to the antenna 3 or to transmit the receive signal from the antenna 3 to the electronic component 4.

FIG. 4 shows a further purely schematic embodiment of a radar arrangement 1, wherein the signal routing, i.e. the lead structure 5 and the waveguide arrangement 15 are designed in the same way as in the first embodiment. In addition, the radar arrangement 1 is completely cast in the region of the electronic component 4. Thus, the casting 11 also does not have a cavity 10 in the region of the lead structure 5. The guiding or the coupling of the high frequency signal into the first partial waveguide 16 or the decoupling of the high frequency signal from the second partial waveguide 17 thus takes place in the casting 11.

7

Figures 5, 6:
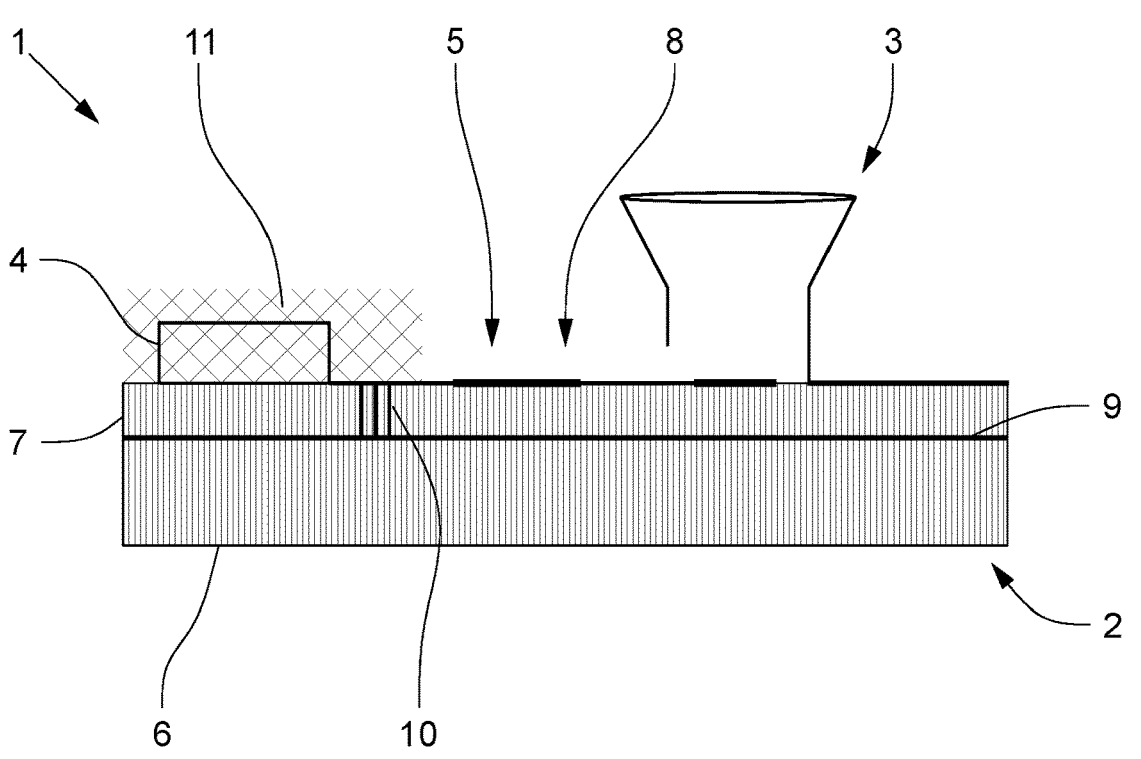
FIG. 5 illustrates a further embodiment of a radar arrangement.
FIG. 6 illustrates a top view of the lead structure of the embodiment shown in FIG. 5.

FIG. 5 shows a further embodiment of a radar arrangement 1 with a multi-layer printed circuit board 2, with an antenna 3, with an electronic component 4 for generating and for converting a high frequency signal, which is designed as an IC in the embodiment shown, and with at least one lead structure 5 for guiding the high frequency signal between the electronic component 4 and the antenna 3.

The multi-layer printed circuit board 2 has a first layer made of a carrier material, which is made of an FR4 composite material and a second layer 7 made of an HF substrate in the embodiment shown.

The upper side of the HF substrate forms the component side 8 of the printed circuit board 2. The electronic component 4 for generating and converting the high frequency signal and the antenna 3 are arranged on the component side 8. In addition, the lead structure 5 for guiding the high frequency signal is also arranged on the component side 8.

The component side 8 is cast in the region of the electronic component 4 for generating and converting the high frequency signal, so that no spark capable of ignition can be generated in the region of the electronic component 4 during operation.

A metal layer 9 is arranged between the first layer 6 and the second layer 7, which has an electrical reference potential. The lead structure 5 is connected to the metal layer 9 in regions via through-holes 10 in such a way that the through-holes 10 form a DC short circuit, so that the lead structure 5 and the metal layer 9 have the same potential during operation. This can ensure that no voltages build up during operation that could result in the generation of sparks in an ignitable atmosphere.

The lead structure 5 has a first conductor 13 and a second conductor 14, wherein the first conductor 13 guides the high frequency signal from the electronic component 4 to the antenna 3 and wherein the second conductor 14 guides the high frequency signal received from the antenna 3 to the electronic component 4, wherein the first conductor 13 and the second conductor 14 are each connected to the metal layer 9 via through-holes 10 forming a DC short circuit.

The first conductor 13 and the second conductor 14 are connected to each other via a directional coupler 21 shown in FIG. 6.

In addition, the lead structure 5 is designed in such a way that the through-holes 10 form only a DC short circuit and the high frequency signal is not or not substantially transmitted via the through-holes 10.

For this purpose, the first conductor 13 and the second conductor 14 are connected to the through-holes 10 via stubs 22 shown in FIG. 6. The stubs 22 are dimensioned such that they are open or shorted at the end for the wavelength of the high frequency signal. In detail, the stubs 22 have a length of $n*\lambda/4$, wherein $\lambda$ is the wavelength of the high frequency signal and wherein n is an odd number.

Also in this embodiment, at least one through-hole 10 of each conductor 13, 14 is arranged in the region of the casting 11 and at least one through-hole 10 of each conductor 13, 14 is arranged outside the casting boundary 20. Thus, the embodiment shown also has the advantage that a particularly safe transmission of the high frequency signal can be ensured.

The invention claimed is:

1. A radar arrangement, comprising:
at least one multi-layer printed circuit board;
at least one antenna;
at least one electronic component for generating and converting a high frequency signal; and

8 at least one lead structure for guiding the high frequency signal between the electronic component and the antenna;
wherein the multi-layer printed circuit board includes at least one first layer of a carrier material and at least one second layer of an HF substrate;
wherein the HF substrate has a component side and wherein at least the electronic component for generating and converting the HF signal and the antenna are arranged on the component side;
wherein the at least one lead structure for guiding the HF signal is arranged at least in regions on the component side;
wherein the component side is cast at least in the region of the electronic component for generating and converting a high frequency signal;
wherein a metal layer having an electrical reference potential is arranged between the first layer and the second layer;
wherein the lead structure is connected to the metal layer in areas via at least one through-hole in such a way that the at least one through-hole forms a DC short circuit so that the lead structure and the metal layer have a same potential during operation;
wherein a plurality of through-holes forming a DC short circuit are present between the lead structure and the metal layer, which together with the lead structure and the metal layer form a waveguide in the HF substrate for guiding the high frequency signal;
wherein the through-holes are designed and arranged in such a way that a first conductor of the lead structure confines a first partial waveguide via which the high frequency signal is guided from the electronic component to the antenna and that a second conductor of the lead structure confines a second partial waveguide via which a received high frequency signal is guided from the antenna to the electronic component; and
wherein the first partial waveguide and the second partial waveguide have a common guide region.

2. The radar arrangement according to claim 1, wherein the antenna is metallically conductive; and
wherein the antenna is potential-free or is connected to the reference potential.

3. The radar arrangement according to claim 1, wherein the reference potential is a ground potential of the electronic component for generating and for converting the high frequency signal.

4. The radar arrangement according to claim 1, wherein at least one through-hole is arranged in the region of a casting.

5. The radar arrangement according to claim 4, wherein the casting has a cavity in the region of the lead structure.

6. The radar arrangement according to claim 4, wherein the waveguide is arranged by area in the region of the casting, so that during operation a coupling of the high frequency signal into the waveguide or a decoupling of the high frequency signal from the waveguide takes place in the region of the casting.

7. The radar arrangement according to claim 1,
wherein the first conductor carries the high frequency signal from the electronic component to the antenna;
wherein the second conductor carries the high frequency signal received from the antenna to the electronic component; and
wherein the first conductor and the second conductor are each connected to the metal layer via at least one through-hole forming a DC short circuit.

8. The radar arrangement according to claim 1, wherein the high frequency signal is guided to the antenna during operation by means of the lead structure; and wherein the lead structure is arranged completely on the component side.

9. The radar arrangement according to claim 8, wherein the first conductor carries the high frequency signal from the electronic component to the antenna;

wherein the second conductor carries the high frequency signal received from the antenna to the electronic component;

wherein the first conductor and the second conductor are each connected to the metal layer via at least one through-hole forming a DC short circuit; and wherein the first conductor and the second conductor are connected to each other via a directional coupler.

10. A radar arrangement, comprising:

at least one multi-layer printed circuit board;

at least one antenna;

at least one electronic component for generating and converting a high frequency signal; and at least one lead structure for guiding the high frequency signal between the electronic component and the antenna;

wherein the multi-layer printed circuit board includes at least one first layer of a carrier material and at least one second layer of an HF substrate;

wherein the HF substrate has a component side and wherein at least the electronic component for generating and converting the HF signal and the antenna are arranged on the component side;

wherein the at least one lead structure for guiding the HF signal is arranged at least in regions on the component side;

wherein the component side is cast at least in the region of the electronic component for generating and converting a high frequency signal;

wherein a metal layer having an electrical reference potential is arranged between the first layer and the second layer;

wherein the lead structure is connected to the metal layer in areas via at least one through-hole in such a way that the at least one through-hole forms a DC short circuit so that the lead structure and the metal layer have a same potential during operation;

wherein the lead structure is connected to at least one through-hole via at least one stub; and wherein the stub is dimensioned in such a way that the high frequency signal is not transmitted or is not substantially transmitted to the through-hole.

11. The radar arrangement according to claim 10, wherein the antenna is metallically conductive; and wherein the antenna is potential-free or is connected to the reference potential.

12. The radar arrangement according to claim 10, wherein the reference potential is a ground potential of the electronic component for generating and for converting the high frequency signal.

13. The radar arrangement according to claim 10, wherein at least one through-hole is arranged in the region of a casting.

14. The radar arrangement according to claim 13, wherein the casting has a cavity in the region of the lead structure.

15. The radar arrangement according to claim 13, wherein a waveguide is arranged by area in the region of the casting, so that during operation a coupling of the high frequency signal into the waveguide or a decoupling of the high frequency signal from the waveguide takes place in the region of the casting.

16. The radar arrangement according to claim 10, wherein the lead structure has a first conductor and a second conductor;

wherein the first conductor carries the high frequency signal from the electronic component to the antenna;

wherein the second conductor carries the high frequency signal received from the antenna to the electronic component; and wherein the first conductor and the second conductor are each connected to the metal layer via at least one through-hole forming a DC short circuit.

17. The radar arrangement according to claim 10, wherein the high frequency signal is guided to the antenna during operation by means of the lead structure; and wherein the lead structure is arranged completely on the component side.

18. The radar arrangement according to claim 17, wherein the lead structure includes a first conductor and a second conductor;

wherein the first conductor carries the high frequency signal from the electronic component to the antenna;

wherein the second conductor carries the high frequency signal received from the antenna to the electronic component;

wherein the first conductor and the second conductor are each connected to the metal layer via at least one through-hole forming a DC short circuit; and wherein the first conductor and the second conductor are connected to each other via a directional coupler.

\* \* \* \* \*